Patented Jan. 14, 1936

2,027,965

UNITED STATES PATENT OFFICE 2,027,965

METHOD OF DEMULSIFYING THE SEALING OILS OF WATERLESS GASHOLDERS

Hans Dellmann, Mainz, Germany, assignor to Maschinenfabrik Augsburg-Nuernberg A. G., Nuernberg, Germany, a corporation of Germany No Drawing. Application February 25, 1932, Serial No. 595,234. In Germany February 26, 1931

2 Claims. (Cl. 196—15)

It is known that as tightening or packing liquid for waterless gasholders tar and tar oils are used. As the tar or the tar oil passes through the circuit provided for it in the gasholder, it takes up foreign bodies, as, for instance, iron from the sheet-metal plates of the holder shell and linseed oil from the protective coating, as well as blast furnace dust and carbon from the gas to be accumulated in the holder where blast furnace gases are being stored. Besides, water of condensation originating from the stored gas separates upon the oil film trickling down upon the inner surface of the shell, and forms very fine drops upon such oil film. In the presence of the foreign bodies these drops of water of condensation remain in the oil in a more or less persisting form, and there arises in this manner a more or less persisting water-oil emulsion which must be separated into its component substances if the proper operation of the gasholder is not to be disturbed. For clearing said emulsions, that is to say, for separating the water from the oil, precipitation vessels are used in which the heavy oil collects on the bottom, whereas the lighter water collects above the oil. This separation is, however, never perfect, as a considerable part of the contents of said vessel consists of said water-oil emulsion. Removing the latter would be of a questionable value if the foreign bodies were not removed at the same time, as it is such bodies that make said emulsion persistent; they are, in fact, responsible for the continual formation of emulsion in a comparatively short time.

The present improved method aims first of all at removing the said foreign bodies from the emulsion. A self-separation of the emulsion into its component substances, viz. the water, the oil, and the foreign bodies, takes place either only very slowly or not at all. But if, according to this invention, a soap emulsion, the percentage of soap of which amounts at least to 1% of the amount of the emulsion, is added to the emulsion, the water and the oil separate quickly from one another. The soap solution is added at atmospheric pressure and with slight heating of the liquid. Instead of the soap, water-glass or a mixture of soap and water-glass may be employed. It has been observed that by the addition stated the water-oil emulsion is reversed into an oil-water emulsion which is very unstable in that the water separates from it practically completely within a few hours. The water flowing upon the oil contains all substances forming, or tending to form, emulsions, that is to say, all foreign bodies which can now be easily removed.

I claim:

1. A method of removing emulsion-forming impurities, such as dust, metal dust, linseed oil and the like, from already used sealing or packing liquids of waterless gasholders substantially free of sulphonated hydrocarbons, consisting in slightly heating the water-oil emulsion which has formed during use, adding thereto at atmospheric pressure a mixture containing material amounts both of soap and of water-glass, the total amount of soap and water-glass amounting to at least 1% by weight, leaving the mixture to itself until it has separated into a lower layer of oil and an upper layer of water and impurities, and separating said upper layer from said lower one.

2. A method of removing emulsion-forming impurities, such as dust, metal dust, linseed oil and the like, from already used sealing or packing liquids of waterless gasholders substantially free of sulphonated hydrocarbons, consisting in slightly heating the water-oil emulsion which has formed during use, adding thereto at atmospheric pressure at least 1% by weight of water-glass, leaving the mixture to itself until it has separated into a lower layer of oil and an upper layer of water and impurities, and separating said upper layer from said lower one.

HANS DELLMANN.